Feb. 22, 1966     D. E. CARTER ETAL     3,236,828
METHOD FOR REDUCING CROSS-LINKING IN POLYMERIZATION PROCESSES
Filed Nov. 30, 1962     2 Sheets-Sheet 1
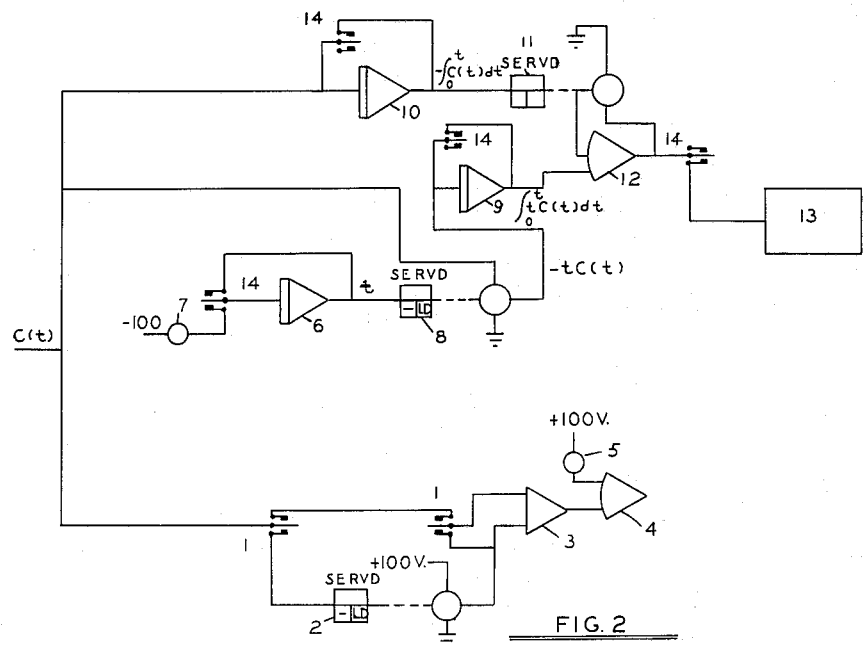
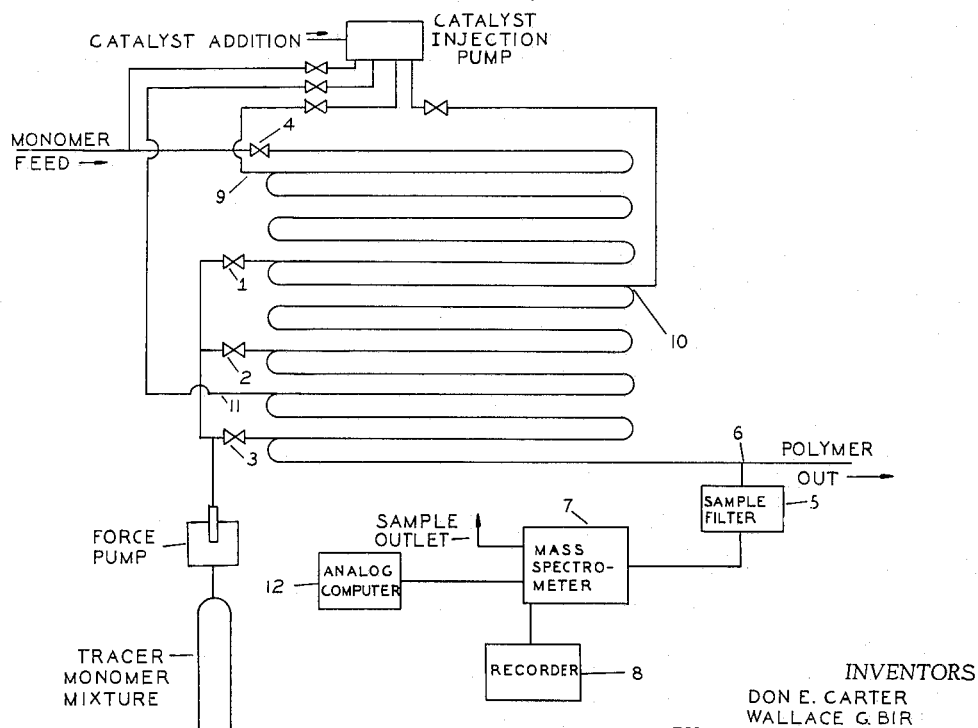
INVENTORS
DON E. CARTER
WALLACE G. BIR
BY
*Lloyd B. Stevens, Jr.*
ATTORNEY

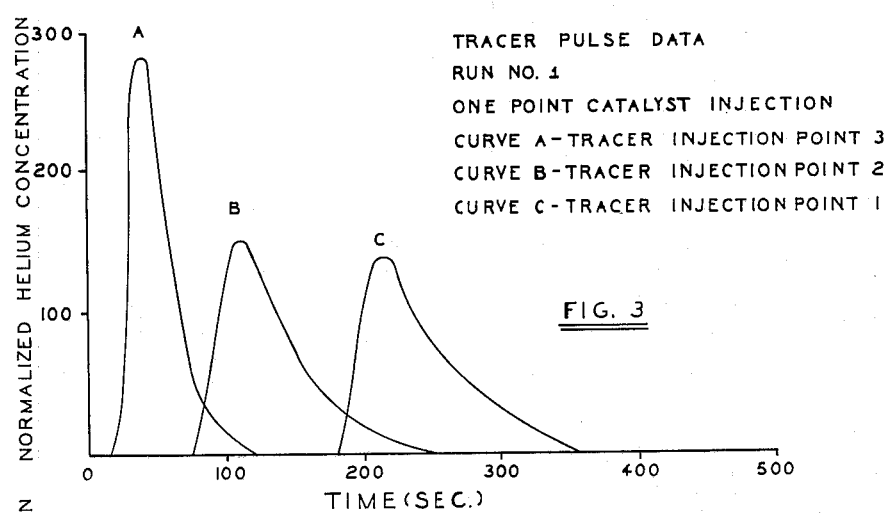
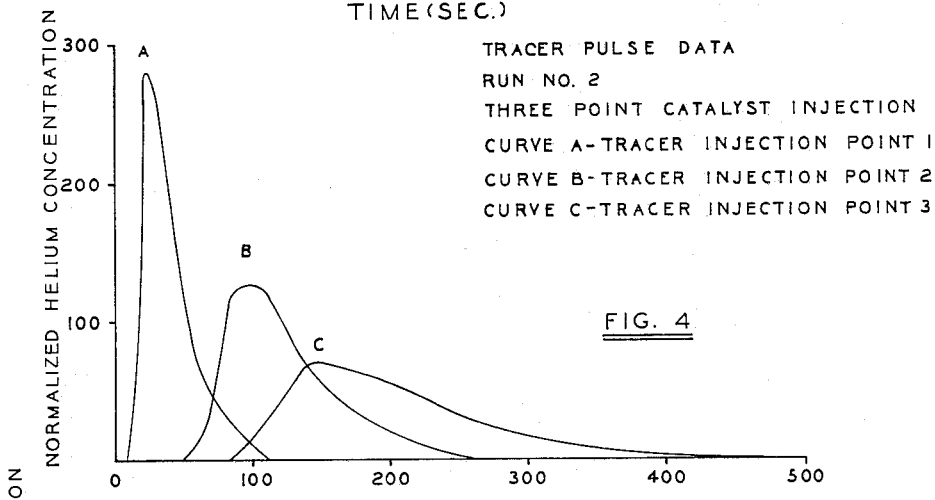
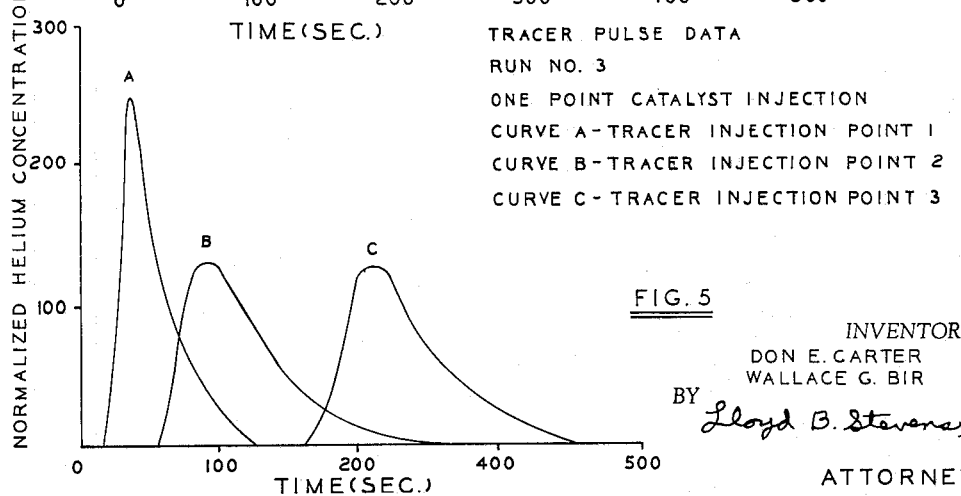

United States Patent Office 3,236,828
Patented Feb. 22, 1966

3,236,828
METHOD FOR REDUCING CROSS-LINKING IN POLYMERIZATION PROCESSES
Don E. Carter, St. Louis, Mo., and Wallace G. Bir, Texas City, Tex., assignors to Monsanto Company, a corporation of Delaware
Filed Nov. 30, 1962, Ser. No. 241,434
11 Claims. (Cl. 260—94.9)

This invention relates to a method for controlling polymerization processes by measuring and controlling the amount of mixing occurring in the reactor wherein the polymer is produced. More specifically, this invention relates to a method for reducing the amount of cross-linked polymer in a finished polymer product by measuring and controlling the amount of mixing occurring during the polymerization.

Cross-linked polymer is an undesirable by-product of many polymerizations. For those finished products in which cross-linked material is undesirable, it may be so for a variety of reasons. Cross-linking may reduce the solubility of a polymer, thus making it more difficult with which to work. Molding and shaping of some polymers is rendered more difficult because of the presence of cross-linked material. Other polymers exhibit decreased clarity and poorer film properties if contaminated with this by-product. Often the presence of cross-linked product is so objectionable for a particular use of a polymer that it must be extracted from the polymer, thereby decreasing the yield of acceptable product.

It is therefore the principal object of this invention to provide a method for controlling cross-linking of polymer during its manufacture.

Additional objects, benefits, and advantages will become apparent as the detailed description of the invention proceeds.

This invention is based upon our discovery, not heretofore recognized, that cross-linking in a polymerization reaction is directly related to the amount of mixing of materials occurring in the reactor. And our embodiment of this discovery is a method which permits accurate detection of mixing and sets forth means for controlling it.

Broadly, this invention comprises measuring the amount of axial and radial mixing occurring in a polymerization reactor, controlling this phenomenon by adjustment of one or more operating variables, and thereby reducing the formation of cross-linked polymer.

Measurement of mixing can be accomplished in several different ways well known to those skilled in the art. One method particularly well adapted for use in the practice of this invention comprises the injection into an apparatus of a pulse of preferably gaseous material under high pressure; detecting and measuring the length of time required for elution, and the shape and area of the concentration curve of this tracer material at some downstream point; and subsequently calculating from this information the amount of mixing occurring in the system. An obvious and oftentimes helpful variation of the above method comprises the injection of a tracer pulse at two or more points spaced at intervals along the flow stream. By measuring the concentration curves of the gas injected at these different points at some downstream point, and relating the shapes of the curves obtained by pulse injection at any two points, it is possible to determine the amount of mixing occurring between these two points in the system. Although a method such as this may be adapted to many types and shapes of containers, it is particularly well suited for measurements of mixing in tubular devices in which the material to be tested is flowing through the apparatus. Further, although this method is adaptable to batch-type polymerizations, it is particularly well suited to a process wherein the monomer feed is continuously added to a reactor and finished polymer product is continuously withdrawn from the system.

The inventive method described in this disclosure is of generic application to the addition polymerization and/or copolymerization of polymerizable compounds having an

group. Thus it is applicable to monomeric unsaturated polymerizable compounds in which the unsaturation is due to a single terminal ethylenic group which is attached to a negative radical. It is thus applicable to polymerizable vinylidene compounds, including vinyl compounds; it is thus applicable to polymerizable acrylyl and alkacrylyl compounds. It is also applicable to compounds having a single polymerizable non-terminal ethylenic group or a plurality of ethylenic linkages of an aliphatic character, either conjugated or isolated. A particularly preferred class is that of polymerizable unsaturated compounds wherein the carbon to carbon unsaturation consists of a terminal methylene, $CH_2$, joined by an ethylenic double bond to its adjacent carbon atoms, i.e., a

group.

Compounds and combinations of compounds to which this method of controlling cross-linking in a polymerization or copolymerization reaction can be applied include: mono-olefinic compounds such as ethylene, propylene, and butylene; acrylyl and alkacrylyl compounds such as acrylonitrile, methacrylic acid, and ethyl methacrylate; vinyl compounds such as vinyl acetate, vinyl chloride, vinylidine fluoride, N-vinyl succinimide, styrene, and vinyl naphthalene.

Specific examples of copolymerizations susceptible of control by this invention include polymerizations combining: ethylene and vinyl chloride, isobutylene and vinyl acetate, vinyl acetate and vinyl methyl ether, and acrylonitrile and isobutylene.

In the actual measurement of mixing, a material, preferably gaseous and inert with respect to the component or components to be measured, is injected into the flow stream at a pressure exceeding that present in the vessel. This pressurized injection is desirable because it places the tracer in the flow stream with a minimum of mixing from extraneous sources. Depending upon the tracing material and the sensitivity of the detector employed, it may also be desirable to dilute the tracer before injection with the same material as that to be used as the monomer feed. After injection, the flow stream at some downstream point is monitored with a suitable detector. If a helium tracer pulse is utilized, a mass spectrometer calibrated to detect helium is especially well suited for the type of measurement required. The choice of tracer material depends to some extent on the composition of the flow stream. Helium, nitrogen, argon, carbon dioxide, carbon tetrachloride, and water are examples illustrative of components which may be used as tracers. There are likewise many analytical instruments which can be used, the choice again depending to some extent upon the content of the flow stream and the composition of the tracer. Examples of detectors include a mass spectrometer, thermal conductivity cell, and electrolytic hygrometer.

The invention can be more clearly understood when read in conjunction with the accompanying drawings in which:

FIGURE 1 is a drawing of a polyethylene reactor adapted for measurement of mixing;

FIGURE 2 is a diagram of an analog computing circuit suitable for determining mixing values; and FIGURES 3, 4 and 5 are drawings of tracer concentration curves produced by pulse injection at specified points during the operation of a polyethylene reactor.

A very satisfactory method of monitoring and measuring the tracer distribution in the flow stream is to record the signal from the analytical instrument on a recorder, in which case the ordinate of such a graph would be expressed in units of concentration and the abscissa would be expressed as a function of time with $t=0$ being the point of tracer injection and the remaining values of $t$ indicating time elapsed since tracer injection. FIGURE 3 shows typical tracer curves which can be used to determine amounts of mixing occurring between different points in a system. The amount of mixing occurring between a pulse injection point and the detector is expressed in terms of a mixing number, or more specifically, a ratio $M_1/M_0$ in which $$M_0 = \int_{t_i}^{t_f} c(t)\,dt \text{ and } M_1 = \int_{t_i}^{t_f} (t-t_i)c(t)\,dt$$

wherein $c(t)$ is the concentration of the tracer pulse as a function of time; $t$ is the time measured from the time the tracer was injected; $t_i$ is the time the tracer first appears at the detector in detectable concentration and $t_f$ is the time at which the tracer has substantially disappeared at the detector. By an appropriate translation of the time axis, $t_i$ may be set equal to zero. Thus to obtain a number indicative of the degree of mixing between pulse injection point 1 of FIGURE 1 and the detector, the $M_1/M_0$ value is calculated by reference to a concentration curve, such as curve $c$ presented in FIGURE 3. If it is desired to obtain a number indicative of the mixing occurring between two points in the reactor, i.e. between injection points 1 and 3 of FIGURE 1, the value $M_1/M_0$ for point 1 and the value $M_1/M_0$ for point 3 are calculated and these two values compared by taking their ratio or their difference. A consistent scheme for comparing results must obviously be employed, i.e. if only one injection point is used, all data to be compared must be taken in this manner and if two injection points are used all data must be taken in the same way and compared on the same basis. This calculation may be performed manually by obtaining the area under the concentration curve using a planimeter or an automatic integrator attached to a recorder, by measuring the time required for the elution of the tracer, and then solving the equations given above with this information. The calculation may also be performed automatically by transmitting the signal from the detector to an analog computing circuit such as that shown in FIGURE 2.

A calculation such as described above, regardless of the manner in which performed, is sufficiently adapted to include both axial and radial mixing caused by laminar and turbulent flow patterns, respectively. This is important in any measurement of mixing characteristics since both types of mixing occur to some extent in nearly all real systems, and a method which accounts for only one type of mixing, although suitable for some systems where the other type of flow is negligible, cannot be applied to all systems with equal success. And since cross-polymerization is affected by both axial and radial mixing, an expression of mixing based upon a calculation of the moments of the tracer concentrations such as described above is particularly well adapted to the objects of this invention.

After detection and measurement of the mixing occurring in a vessel or conduit, there are several variables which can be adjusted to give a proper rate of mixing. Some of these variables are operating conditions, such as temperature, pressure, flow rate, kick cycle, and manner of catalyst injection, whereas others are feed and product properties, such as viscosity and melt index, which can be varied dependently or independently of the operating conditions. But since these feed and product properties can likewise be varied to influence mixing, they also will be hereafter referred to as operating conditions. Depending upon the particular reaction and composition of the reactants and product, it may be desirable to vary the temperature, pressure, flow rate of the system, kick cycle, melt index of the finished polymer, manner of catalyst injection, viscosity of the flow stream, or a combination of two or more of these variables to achieve the optimum degree of mixing. Although it may be desirable to reduce mixing as much as possible in order to produce a minimum of cross-linked polymer, in most systems it is usually necessary to tolerate some mixing of components for the sake of an economically satisfactory yield. Hence the word *optimum* is used to indicate a balance of considerations, namely percent yield vs. product quality. Further the amount of tolerable cross-linking in a polymer may vary considerably depending upon the final use for the polymer. That is, relatively large amounts of cross-linked material may not interfere with certain uses for a polymer. In this respect, the *optimum* values for operating conditions may themselves vary, depending upon considerations of cost, quality, and proposed uses. However, the practice of this invention provides the type of measurement and process control necessary to regulate the manufacture of polymer within these predetermined limits.

For this reason, it may often be desirable in controlling mixing to vary the above operating conditions in only a part of the reactor with the intent either to localize the polymerization or to distribute it over the length of the reactor. Such segmented control may provide a satisfactory yield while still permitting a significant reduction in mixing, and hence cross-linking. This can be accomplished to some extent by providing a polymerization reactor with multiple heaters spaced along the length of the reactor so that the temperature of certain segments can be adjusted independently of the temperature of other portions of the reactor. Also by injection of catalyst at one or several points, polymerization can be localized in or distributed throughout the reactor to some extent.

Segmented control of such a nature is also important because it has an influence upon the viscosity of the flow stream, another variable which has a profound effect upon flow characteristics. As a general rule, axial mixing caused by laminar flow is increased with increased viscosity of the flow stream, whereas radial mixing caused by turbulent flow is encouraged by decreased viscosity of the stream. The viscosity of the flow stream can be adjusted by the introduction of modifiers or inert diluents into the monomer feed. Viscosity can also be adjusted by alteration of the ratio of monomer to polymer in the stream, such as change in ratio being accomplished by the formation of polymer at an early or late stage in the reactor as described above.

An indirect method of control is furnished by a determination of melt index which is a measurement of the bulk viscosity of a finished polymer. Such a determination supplies information as to the effects of temperature, pressure, flow rate, viscosity, etc. on the finished polymer product, thereby providing a variable which in some cases is more closely related to mixing control than the ultimate variables of temperature, etc., mentioned above.

Another method of controlling mixing which requires further explanation is that of a "kick" cycle. This variable is fully described in U.S. 2,852,501, and its variation within the limits set forth in the patent has an influence on the mixing which occurs during polymerization.

A full understanding of the effect of each variable upon product yield and production of cross-linked polymer will allow those skilled in the art to increase product yield and quality by adjustment of operating conditions, and at the same time permit them to maintain a close control on cross-linking by reference to the mixing values for the flow streams measured.

The invention will be more clearly understood from the detailed description of the following specific example thereof read in conjunction with the accompanying drawings.

EXAMPLE I

A polyethylene reactor such as that shown in FIGURE 1 was provided with pulse injection points 1, 2 and 3. Points for catalyst addition were provided at valves 9, 10, 11 and at the reactor inlet 4. During this run catalyst was injected only through valve 11. Ethylene monomer was continuously introduced into the reactor through valve 4 and thereafter flowed through the tubing of the reactor at a temperature of 200–250° C. and a pressure around 35,000 lbs./sq. in. Oxygen was used as the catalyst and was injected into the flow stream in quantities necessary to maintain its concentration in the ethylene around 15 parts per million. The pulse medium was a mixture containing 0.5% helium in ethylene. This mixture was injected through quick-opening valves into the reactor stream sequentially at points 3, 2 and 1 at a pressure of 40,000 lbs. per sq. in. At some distance downstream, preferably at a point beyond the tubular bends of the reactor such as point 6, a small portion of the stream was continuously drawn off and passed through a sample filter 5 to remove polymer before passing the stream into the mass spectrometer 7. The polymer-free stream was then run through a model MS-98 VEECO mass spectrometer 7 for analysis of the helium content of the reactor stream. As the helium injected at point 3 was eluted, curve $a$ presented in FIGURE 3 was obtained on the recorder 8. The next helium peak detected was that from the point 2 injection; this curve is shown as curve $b$. The final helium concentration curve shown in FIGURE 3 as curve $c$ was a representation of the helium dispersion in ethylene which occurred between injection point 1 and the sample drawoff 6. Since point 3 was located nearest the end of the reactor, it was expected that less mixing would occur between that point and the sample drawoff than between points 1 or 2 and the sample drawoff. The concentration curves from the three points confirm this. Curve $a$ was sharper and exhibited less trailing than the other curves, thus indicating less mixing, whereas curve $c$ was the broadest curve, thus indicating a greater amount of mixing.

The signal from the mass spectometer 7 was subsequently transmitted to an analog computer 12 for calculation of the mixing values according to the equations given earlier. Results of this run (run 1) are presented in Table 1 below.

Referring to FIGURE 2, in which the various computing components are indicated by the symbols frequently used in describing analog computing circuits, the signal $c(t)$ is received from the tracer concentration transducer. When a pulse is injected the double-pole double-throw switch 1 is in the down position, causing servomultiplier 2 to track the input signal $c(t)$ and causing the input to summing amplifier 3 to be shorted. When the helium pulse is injected, switch 1 is moved to the up position stopping the input to servomultiplier 2. The output of servomultiplier 2 is the reference level of $c(t)$, designated $c(o)$. When switch 1 is in the up position the summing amplifier 3 forms the difference $[c(o)-c(t)]$. This difference is compared in relay amplifier 4 with a small positive voltage from potentiometer 5. When the magnitude of the difference $[c(o)-c(t)]$ exceeds the small voltage from potentiometer 5, the four relay switches 14 move from the up to the down position. The time at which this occurs is $t_1=0$.

The time function $t$ is generated in the output of integrator 6 by integration of the signal from potentiometer 7. The product, $-tc(t)$, is formed in servomultiplier 8 and the integral $$\int_0^t tc(t)\, dt$$

in integrator 9. The integral $$-\int_0^t c(t)\, dt$$

is formed in integrator 10 and divided into the output of integrator 9 in the division circuit consisting of servomultiplier 11 and high gain amplifier 12 to give the ratio $$\frac{\int_0^t tc(t)\, dt}{\int_0^t c(t)\, dt}$$

This ratio is recorded on recorder 13. When the tracer pulse has substantially passed the tracer concentration transducer, the magnitude of the output of amplifier 3 falls below the magnitude of the signal from potentiometer 5, the relay switches 14 return to the up position, which resets the integrators. The maximum value recorded by recorder 13 is the mixing number $M_1/M_0$. Before injecting another pulse, switch 1 is returned to the down position.

In determining the effect of mixing on cross-linking, two operating variables—melt index and manner of catalyst addition—were adjusted to control mixing. Table 1 shows results of these adjustments on mixing, cross-linking, and product yield.

Table I

| Run No. | Type of Catalyst Addition [1] | Melt Index [2] | Mixing No. [3] | Gel [4] | Percent Conversion [5] |
|---|---|---|---|---|---|
| 1 | 1 point injection | 2.8 | 61 | [6]2 | 12 |
| 2 | 3 point injection | 15.0 | 113 | 6 | 38 |
| 3 | 1 point injection | 7.5 | 58 | | 14 |

[1] Type of catalyst addition is classified as 1 point injection when the catalyst is added to the flow stream at catalyst injection point 11; as two point injection when the catalyst is added to the flow stream at catalyst injection points 10 and 11; and as three point injection when the catalyst is added to the flow stream at catalyst injection points 9, 10 and 11.
[2] Melt index is a measure of the bulk viscosity of the finished polymer expressed in decigrams per minute. The data given were obtained from tests run in accordance with the test procedure set forth in ASTM D-1238-57T.
[3] Higher mixing numbers indicate increased mixing. Mixing numbers reported here indicate mixing between tracer injection point 1 of Figure 1 and sample drawoff 6.
[4] Gel is a measure of the amount of cross-linked material in a polymer. It is measured on a graduated scale from 1 to 8 with the higher numbers indicating increased presence of gel.
[5] Percent conversion is a measure of the amount of monomer feed polymerized.
[6] Figures for gel content were not obtained on run 1; however another run, identical in all respects to run 1, was made and gel content of that polymer was analyzed as 2.

EXAMPLE II

The procedure described in Example I was followed except that the catalyst was injected through valves 9, 10 and 11, and operating conditions were adjusted to give a higher melt index. Tracer concentration curves obtained for this run are shown in FIGURE 4. Results of this run (run 2) are given above in Table 1. Visual comparison of the tracer curves of this run with the curves of FIGURE 3 clearly shows less mixing occurring during run 1 as opposed to run 2; a comparison of the mixing numbers for these two runs confirms increased mixing in run 2 as compared to run 1 of this example, and hence increased gel content as shown in Table 1.

EXAMPLE III

In this example, the effect of one variable on mixing, melt index, is demonstrated. FIGURE 5 shows tracer concentration curves for run 3. In this run, only the melt index was varied from the value used in run 1.

Comparison of tracer concentration curves and mixing numbers for these two runs demonstrates that an increase in melt index results in less mixing in the reactor. Percent conversion of monomer in run 3 was also improved over that obtained in run 1 by this adjustment. Inadvertently, the gel content of finished polymer from run 3 was not obtained.

Although the invention has been described in terms of specified embodiments which are set forth in some detail, it should be understood that this is by way of illustration only and that the invention is not necessarily limited thereto since alternative embodiments and operating techniques will become apparent to those skilled in the art in view of this disclosure. For instance, a less precise method of measuring mixing could be accomplished merely by viewing the shapes of tracer concentration curves and using a visual comparison of curves to determine the amount of mixing occurring under different conditions. Or a tracer dye might be injected at some upstream point and its elution time noted downstream; by relating the time required for its first appearance to the time required for its complete elution, a measure of mixing could be determined. As previously mentioned, there are numerous combinations of operating variables which can be utilized in controlling mixing and it is not our intent to limit ourselves to the particular combination hereinabove set forth in our example. Further, when this method of measuring mixing is applied to one system so that variables such as volume and pressure of the tracer pulse, distance between injection and detection points, and composition of the flow stream are standardized, it then becomes possible to measure the mixing as a function of the time spread of the tracer pulse. This information can then be used to reset internal settings such as temperature, pressure, flow velocity, fluid viscosity, etc., on an automatic controller to obtain the desired degree of mixing. Consequently, these and other modifications are contemplated which can be made without departing from the spirit of the described invention.

What is claimed is:

1. A method of controlling the amount of cross-linked polymer in a finished polymer product which comprises controlling the amount of mixing of the flow stream by measuring at some downstream point in the reactor the shape of a concentration curve obtained from a tracer injected at some upstream point, and controlling the shape of this curve as a function of mixing occurring during the polymerization by adjusting an operating condition.

2. A method according to claim 1 wherein the amount of mixing of the flow stream is controlled by measuring at some downstream point in the reactor the shapes of concentration curves obtained from tracer injections at multiple upstream points, and controlling the shapes of these curves as a function of mixing occurring during the polymerization by adjusting the operating conditions to their optimum values.

3. A method according to claim 2 wherein the finished polymer product is polyethylene.

4. A method according to claim 3 wherein the amount of mixing is controlled by adjusting the temperature of the flow stream to its optimum value.

5. A method according to claim 3 wherein the amount of mixing is controlled by adjusting the pressure of the flow stream to its optimum value.

6. A method according to claim 3 wherein the amount of mixing is controlled by adjusting the flow rate of the flow stream to its optimum value.

7. A method according to claim 3 wherein the amount of mixing is controlled by adjusting the viscosity of the flow stream to its optimum value.

8. A method according to claim 3 wherein the amount of mixing is controlled by adjusting the melt index of the finished polymer to its optimum value.

9. A method according to claim 3 wherein the amount of mixing is controlled by adjusting the kick cycle of the reactor to its optimum value.

10. A method according to claim 3 wherein the amount of mixing is controlled by selection of the optimum points for catalyst injection.

11. A method according to claim 3 wherein the amount of mixing is controlled by adjusting at least two of the following conditions of temperature, pressure, flow rate, viscosity, melt index, kick cycle, and manner of catalyst injection to their optimum values.

No references cited.

JOSEPH L. SCHOFER, *Primary Examiner.*